US006230305B1

(12) United States Patent
Meares (10) Patent No.: US 6,230,305 B1
(45) Date of Patent: *May 8, 2001

(54) METHODS AND APPARATUS FOR CONFIGURING SCHEMATIC DIAGRAMS

(75) Inventor: Lawrence G. Meares, Rancho Palos Verdes, CA (US)

(73) Assignee: Intusoft, San Pedro, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/925,121

(22) Filed: Sep. 8, 1997

(51) Int. Cl.[7] .................................................. G06F 17/50

(52) U.S. Cl. ............................................................ 716/11

(58) Field of Search ........................ 395/500.12, 500.02, 395/500.19, 500.34; 716/1, 11, 18

(56) References Cited

U.S. PATENT DOCUMENTS

| 4,656,603 |   | 4/1987  | Dunn .         |           |
|-----------|---|---------|----------------|-----------|
| 4,675,832 |   | 6/1987  | Robinson et al. . |        |
| 4,813,013 |   | 3/1989  | Dunn .         |           |
| 4,829,446 | * | 5/1989  | Draney         | 364/498   |
| 4,878,179 | * | 10/1989 | Larsen et al.  | 395/500.05 |
| 4,965,741 |   | 10/1990 | Winchell et al. . |        |
| 5,019,992 | * | 5/1991  | Brown et al.   | 395/500.34 |
| 5,111,413 |   | 5/1992  | Lazansky et al. . |        |
| 5,164,911 |   | 11/1992 | Juran et al. . |           |
| 5,278,769 |   | 1/1994  | Bair et al. .  |           |
| 5,325,309 | * | 6/1994  | Halaviati et al. | 364/488 |
| 5,463,563 |   | 10/1995 | Bair et al. .  |           |
| 5,471,399 | * | 11/1995 | Tanaka et al.  | 395/500.12 |
| 5,544,067 |   | 8/1996  | Rostoker et al. . |        |
| 5,623,418 | * | 4/1997  | Rostoker et al. | 395/500.02 |
| 5,629,857 | * | 5/1997  | Brennan        | 716/11    |
| 5,721,959 | * | 2/1998  | Nakamura et al. | 395/500.12 |
| 5,787,268 | * | 7/1998  | Sugiyama et al. | 395/500  |
| 5,801,958 | * | 9/1998  | Dangelo et al. | 364/489   |
| 5,889,677 | * | 3/1999  | Yasuda et al.  | 364/488   |

OTHER PUBLICATIONS

Goodall, S. Analog/Mixed Signal Fault Diagnosis Algorithm and Tool Review, AutoTestCon Proceedings 1994, 351–359, USA.

Simpson, W.R. and Sheppard, J.W. Fault Isolation in an Integrated Diagnostic Environment, IEEE Design & Test, Mar. 1993, 52–66, vol. 10, No. 1, USA.

Pan, C.Y. and Cheng, K.T. Test Generation for Linear, Time Invariant Analog Circuits 3th IEEE Intl. Mixed–Signal Testing Workshop, Jun. 3–6, 1997, 93–100, USA.

Dill, H. A Comparison of Conventional and Inference Model Based TPS Development Processes, AutoTestCon, 1995, 160–168. USA.

(List continued on next page.)

Primary Examiner—Matthew Smith
Assistant Examiner—Leigh Marie Garbowski
(74) Attorney, Agent, or Firm—Blakely, Sokoloff, Taylor & Zafman LLP (57) ABSTRACT

A computerized drawing system enables a set of schematic diagrams to be created and modified. Display information associated with a circuit is entered into a computer. The display information may include symbols, interconnections, and other information. A plurality of schematic layers are created from the display information and stored. A plurality of schematic configurations are then defined by a layer or by combining two or more layers together. Any given layer may be included in more than one configuration. The configurations are then stored for utilization during the design process. A user may modify one of the created layers. The system then automatically modifies each of the configurations which contain the modified layer. While a configuration is being displayed, a user may highlight information of the layers which is included in the displayed configuration.

20 Claims, 4 Drawing Sheets

OTHER PUBLICATIONS

Dill, H., Bratton, K., Sparr, C., and Pitzen, L. Application of Analog & Mixed Signal Simulation Techniques to the Synthesis and Sequencing of Diagnostic Tests. AutoTestCon, 1997 USA. No pg #.

UL Standards–On–Diskette User Guide, Underwriters Laboratories, Inc. ISBN 0–7629–1193–8, 1996, 1 7, USA. Cass Red Team Package data item DI–ATTS–80285B, Fig. I—SRA/SRU Fault Accountability Matrix Table, 11. No Date.

Nagel, LW and Pederson, DO. Spice 2: A Computor Program to Simulate Semiconductor Circuits, ERL Memo No. ERL Memo No. ERL–M520, University of California, Berkeley, May 1975,USA. No pg #.

Johnson, B, Quarles, T, Newton, Ar, Pederson, Do, Sangiovanni–Vincentelli, A. Spice 3 Version 3f User's Manual, University of California, Berkeley, Oct. 1992, USA. No pg #.

IsSpice4 User's Guide, Intusoft, 1997, USA. No pg #.

Cox, F, Kuhn, W, Murray, J, and Tynor, S. Code–Level Modeling in XSPICE, Proceedings of the 1992 Intl. Syp. on Circuits and Systems, May 1992, USA. No pg #.

XSPICE Users Manual, Georgia Institute of Research, Georgia Institute of Technology, 1992, USA. No pg #.

Hamida, NB, Saab, K, Marche, D, Kaminska, B, and Quesnel, G. LIMSoft: Automated Tool for Design and Test Integration of Analog Circuits. 2nd IEEE International Mixed Signal Testing Workshop, May 1996, Canada. No pg #.

Hamida, NB and Kaminska, B. Analog Circuit Fault Diagnosis Based on Sensitivity Computation and Functional Testing. IEEE Design and Test of Computers, 1992, 30–39.

Sandler, S. SMPS Simulation with SPICE, 1997. McGraw–Hill, USA. No pg #.

* cited by examiner

METHODS AND APPARATUS FOR CONFIGURING SCHEMATIC DIAGRAMS

FIELD OF THE INVENTION

The present invention is directed to methods and apparatus for developing schematic diagrams. More particularly, the present invention is directed to methods and apparatus for developing schematic diagrams by using a computerized system which allows a user to create and subsequently modify and extract information from a set of configurable schematics with computer-aided engineering applications.

BACKGROUND OF THE INVENTION

The cost of designing and producing circuits is expensive. Accordingly, engineers need to ensure that the circuits they are designing function as desired. A number of computer applications have been developed which allow design engineers to test their circuits prior to actually incurring the cost of production. Some of these computer-aided engineering applications are based on "SPICE," which was first developed by the University of California at Berkeley and later refined by a number of institutions, including the Georgia Institute of Technology. The SPICE-based applications provide design engineers with the necessary tools to create, test, and simulate circuits on a computer.

Different levels or stages of the circuit design process require different schematic diagrams. For example, a design engineer may use a "closed-loop" schematic during a development stage, while a production engineer may use a "production" schematic. Further, a test engineer may create a number of schematics to test a circuit according to different sets of stimuli and load conditions. Although the schematics are associated with the same core circuit and may incorporate a number of the same components, each of the schematics will include a number of elements unique to that particular schematic incarnation.

A long-standing problem in electrical and mechanical circuit design is the conflict between the needs of the design engineer and the needs of the production engineer. A design engineer uses electronic design automation (EDA) tools to create a circuit that meets desired specifications. During the design process, the design engineer builds multiple configurations of the circuit. The operation of the circuit is simulated, with parasitic components and stimuli added to modify the simulation. In a top-down design methodology, different levels of abstraction are inserted for different circuit components. In addition, various aspects of electrical behavior are modeled, resulting in different component and simulation configurations. This entire design process results in a schematic diagram which is confusingly cluttered and includes circuitry and data not necessary for production. When the circuit is finalized and ready for production, the schematic needs to be redrawn for or by the production engineer. The redrawing of the schematic is accompanied by a high probability of incurring a transcription error. Any error carried through to the production stage is extremely expensive and burdensome to correct. In addition, any change which is made to one component of the circuit needs to be propagated through all of the different schematics variations which contain that component; accordingly, each of the schematics needs to be re-edited which is expensive, time consuming, and inherent with a probability of error.

One of the conventional approaches to overcoming this problem has been to hide the many auxiliary configurations and variations of the circuit in "subcircuits." Although this approach may function for hierarchical schematic entry, or for extending individual component models, it does not solve the problem of adding test equipment to the circuit, adding different stimuli inputs, or dealing with multiple simulation scenarios.

Accordingly, in view of the foregoing, it is an object of the present invention to provide methods and apparatus which eliminate many of the drawbacks associated with conventional computer-aided engineering applications.

It is an additional object of the present invention to provide a computerized schematic drawing system which allows a user to create and modify a set of schematic diagrams for one or more designs and which substantially eliminates errors and inconsistencies between multiple schematics associated with a common circuit.

SUMMARY OF THE INVENTION

These and other objects are achieved by a computerized schematic drawing system of the present invention. The drawing system allows a user to create a set of schematic diagrams or "configurations." Each of the configurations may contain one or more schematic layers. Each of the layers may contain information intended to be displayed for viewing or processing. This information may include schematic symbols, interconnections between schematic symbols, and other associated information. The drawing system includes an input mechanism, a display, and processing hardware. The input mechanism may receive a number of different types of information, including the display information associated with each of the layers. The input mechanism may also receive information programmatically. The input mechanism also receives layer assignment information which specifies a layer to which the display information belongs, and configuration assignment information which specifies which layers it contains. In addition, the input mechanism may receive control information which specifies other functions of the drawing system. The display may selectively display the configurations and the layers when created and/or modified, if desired. The processing hardware manages all of the information received or generated by the input mechanism and causes the display to selectively display the configurations and the layers that are created.

One of the advantages of the present invention is that a user is able to modify one of the layers and automatically propagate the change throughout each of the configurations which contains the modified layer. This feature substantially eliminates transcription errors which may occur in conventional computer-aided engineering applications. Another advantage of the invention is that a user may selectively highlight any one of the layers which comprise a displayed configuration. This allows the user to graphically or visually determine the contents of each of the layers within any of the configurations. It also allows a user to determine to which layer a particular component belongs.

Other aspects, features, and advantages of the present invention will become apparent to those persons having ordinary skill in the art to which the present invention pertains from the following description taken in conjunction with the accompanying drawings.

DETAILED DESCRIPTION OF EXEMPLARY EMBODIMENTS

Figure 1:
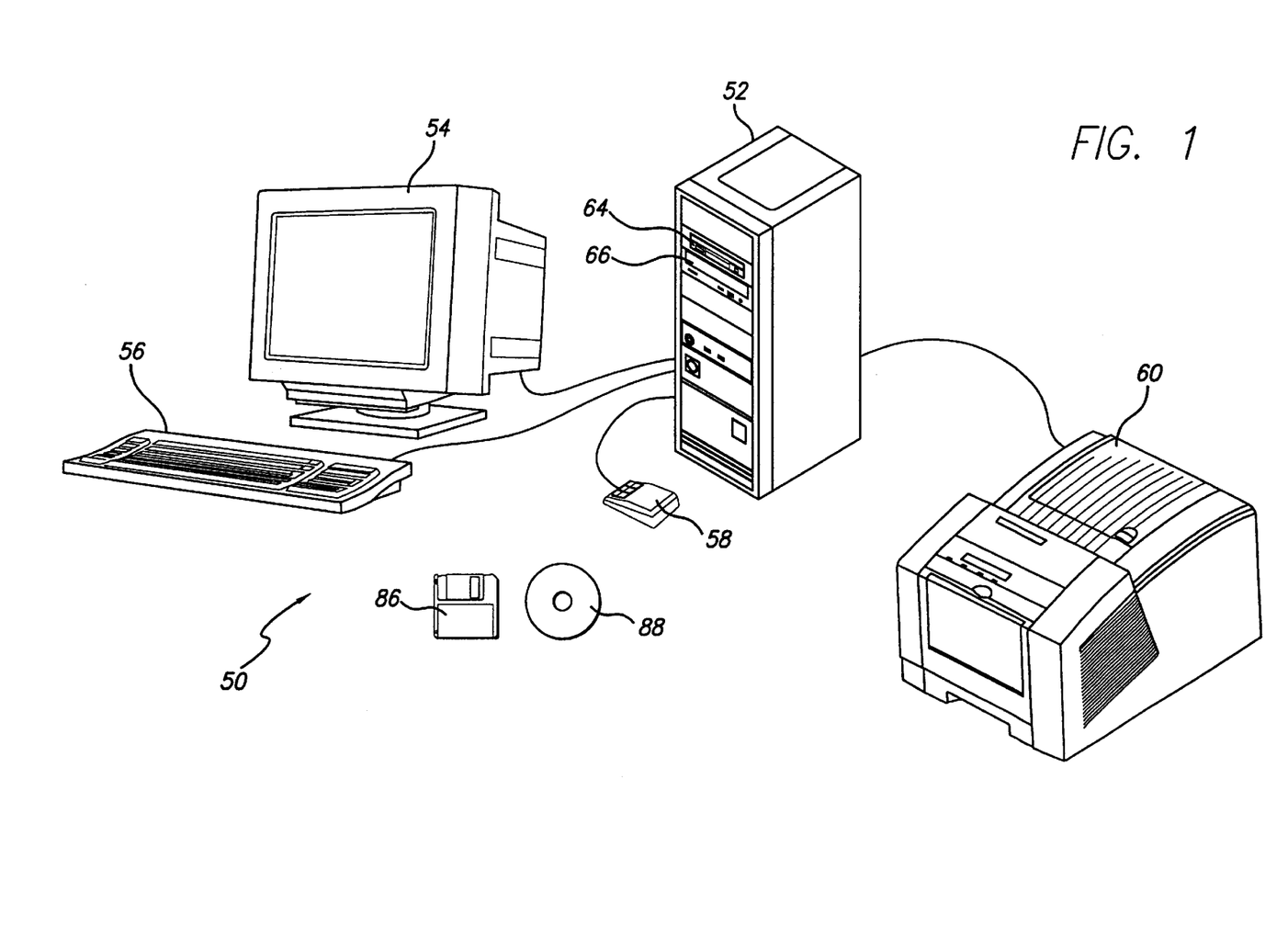
FIG. 1 is a perspective view of a computerized schematic drawing system in accordance with an exemplary embodiment of the present invention.
Figure 2:
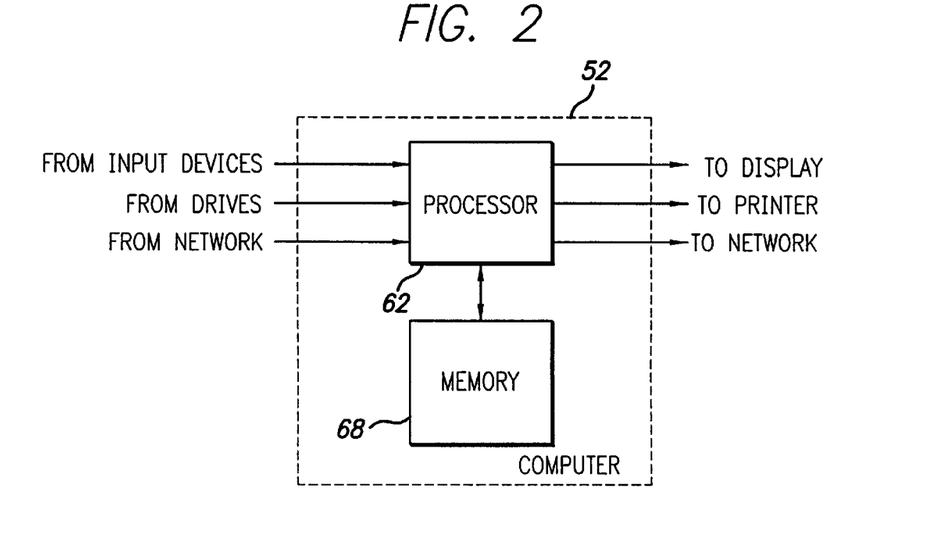
FIG. 2 is a block view of an exemplary embodiment of a computer of the drawing system of the invention.

Referring more particularly to the drawings, FIG. 1 illustrates an exemplary embodiment of a computerized schematic drawing system 50 of the present invention. The exemplary drawing system 50 includes a computer 52, a display 54, an input mechanism such as a keyboard 56 and/or a trackball or a mouse 58, and a printer 60. FIG. 2 illustrates an exemplary embodiment of the computer 52 in which a processor 62 receives data from the input devices 56, 58 and provides data to the display 54 and the printer 60. The computer 52 may also include a drive, such as a floppy drive 64 or a CD-ROM drive 66, in communication with the processor 62. The processor 62 may also be in communication with a computer network via a network interface card (not shown). The computer 52 may include memory 68 connected to the processor 62. The term "processor" used herein refers to any hardware or circuitry for processing data, for example, a central processing unit (CPU).

Figure 3:
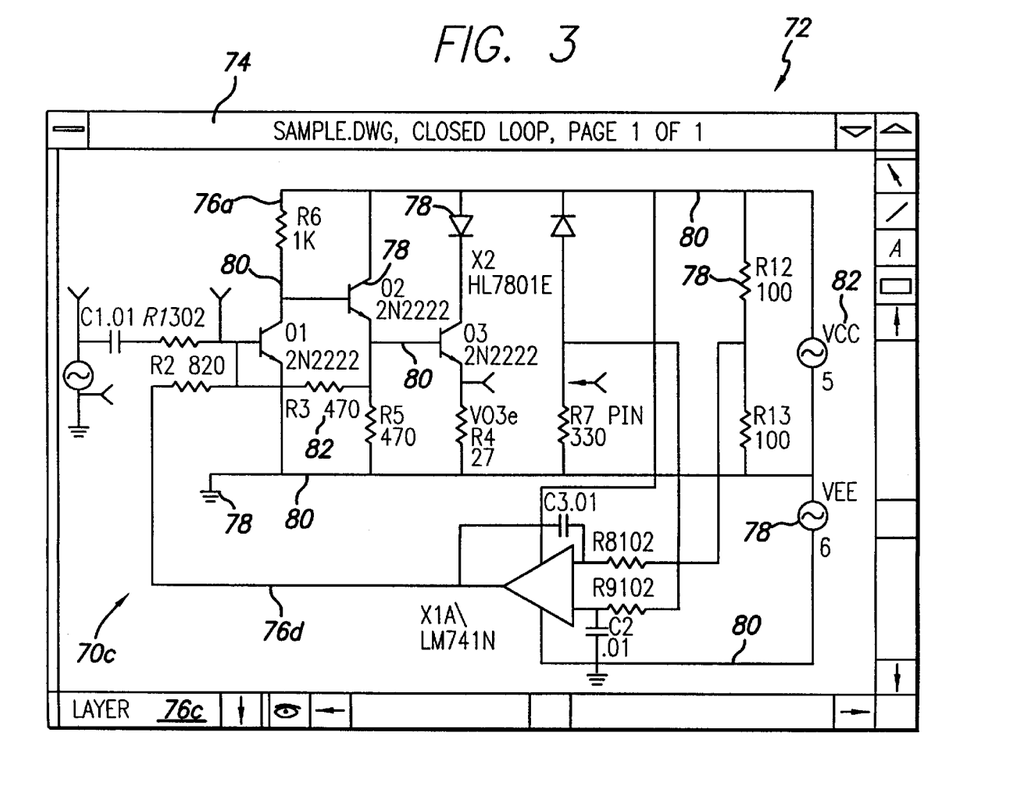
FIG. 3 is a schematic view of an exemplary configuration displayed in a graphical user interface and created in accordance with the present invention.

The drawing system 50 enables a user to create, modify, extract data (i.e. netlist and other text and binary types of information) and print a set of schematic diagrams. An exemplary schematic diagram or configuration 70 is illustrated in FIG. 3. Schematic configuration 70a (which is generally referenced with numeral 70 with an alpha specifier a) is shown in a graphical user interface (GUI) 72 displayed on the display 54. Configuration 70a is entitled "Closed Loop" as shown on a title bar 74 of the GUI 72. Exemplary schematic configuration 70a is composed of a plurality of schematic segments or layers generally indicated by reference numeral 76. Each of the individual layers 76 also has a specific alpha, for example, 76a and 76c. Each of the layers 76 contains a unique set of information or data. The set of information may include schematic symbols 78 representing circuit components, interconnections 80 between the schematic symbols 78, and other optional associated information 82 such as component specifications, simulation directives including stimuli and loads, pictures, text, notes, graphs, and so on. The symbols 78, the interconnections 80, and the associated information 82 essentially comprise display information which may be entered via the hardware input devices 56 and/or 58 or programmatically via other software which interfaces with the present invention, which will be discussed below.

The schematic configuration 70 is a schematic diagram which contains circuit information for a variety of purposes. For example, a production engineer may need a schematic containing a particular set of information for his or her needs, while a test engineer may need another schematic containing another set of information. Accordingly, it is useful to have available a plurality of the layers 76 which may be combined together to form a plurality of schematic configurations 70 each for a different purpose. This relationship between the schematic configurations 70 and the layers 76 is exemplified in TABLE I below.

TABLE I

| | Configuration 70 | | | | |
|---|---|---|---|---|---|
| Layer 76 | Production (70a) | Component (70b) | Closed Loop (70c) | Open Loop (70d) | Safe to Start (70e) |
| Core Circuitry (76a) | X | | X | X | X |
| PWB Layout (76b) | X | | | | |
| Component Level (76c) | | X | | | |
| Feedback (76d) | | | X | | X |
| Test No. 1 (76e) | | | | X | X |
| Test No. 2 (76f) | | | | | X |
| Test No. 3 (76g) | | | X | | X |
| Safe Test (76h) | | | | | X |

Figure 4:
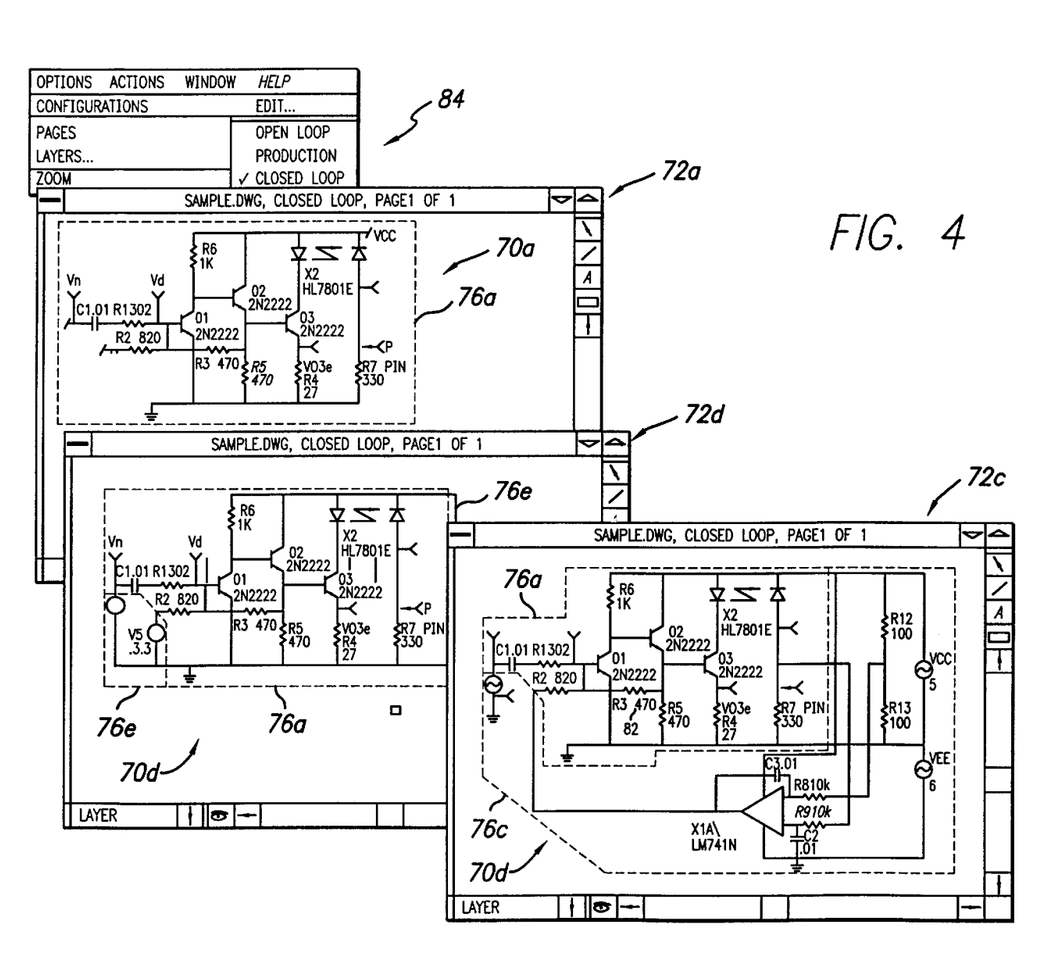
FIG. 4 is a schematic view of exemplary configurations displayed in respective graphical user interfaces and created in accordance with the invention, particularly illustrating a common layer assigned to each of the different configurations.

With additional reference to FIG. 4, in the particular example of TABLE I, the design process of a circuit has resulted in a plurality of layers 76a–76h each containing a unique set of symbols 78, interconnections 80, and associated data 82. Each of the layers 76 may be created by inputting or setting up such display information into the computer 52 via the input devices 56 and/or 58, or by other automated or manual means. This inputting mechanism is represented by step S1 of the exemplary operating procedure of the present invention illustrated in FIG. 5. The data inputting step may be thought to involve entering assignment information into the processor 62 that specifies which layer 76 the display information 78, 80, 82 belongs to (step S1a). Alternatively, the layers 76 may be downloaded via a network connection or the drives 64 and/or 66 (step S1b) or set up programmatically by another software system (step S1c). Each of the layers 76 may be assigned a name indicative of the information contained in the layer, for example, layer 76a is entitled "Core Circuitry"; layer 76b is entitled "Printed Wiring Board (PWB) Layout"; and so on. After defining a number of layers 76 (step S2), the layers 76 may be stored in the memory 68 (step S3) of the computer 52.

From the created layers 76a–76h, a plurality of configurations 70a–70e may be defined (step S4), each of which may be assigned a name. The configurations 70 may be defined by entering configuration assignment information into the processor 62 that specifies which layers 76 are assigned to a particular configuration. Alternatively, configuration assignment information may specify each of the configurations 70 to which a particular layer 76a–76h is assigned. Each of the configurations 70 contains one or more of the layers 76. For example, configuration 70a entitled "Production" (which is illustrated in FIG. 4) contains layers 76a and 76b; configuration 70b entitled "Component" contains layers 76c; configuration 70c entitled "Closed Loop" (which is illustrated in FIGS. 3 and 4) contains layers 76a, 76d, and 76g; configuration 70d entitled "Open Loop" (which is illustrated in FIG. 4) contains layers 76a and 76e; and configuration 70e entitled "Safe to Start" contains layers 76a and 76d–76h. Accordingly, each configuration 70 contains a unique set of layers 76, while any given layer 76 may be contained in more than one configuration 70. For example, layer 76c is contained in each of the configurations 70a, 70c, and 70d illustrated in FIG. 4. Some of the layers 76 may not be included in any of the configurations 70.

In creating the configurations 70, the layers 76 may be combined in any manner. For example, the predefined layers 76 may be combined via the input devices while being indicatively displayed on the GUI 72. The layers 76 may also be downloaded from a file stored on a hard disk, the drives 64 or 66, or via the network connection. Alternatively, the layers 76 may be combined programmatically by other software applications to define the configurations 70. For example, a software application may include instructions to combine certain predefined layers 76 into a particular configuration 70 without any user intervention via the input devices 56 and/or 58. The configurations 70 may be stored (step S5) along with the layers 76 (including all of the information contained in each of the layers 76) in a database in the memory 68 of the computer 52.

The stored configurations 70 and layers 76 may be in the form of computer files that can be used by the computer 52 in conjunction with other computer programs or software applications or by another network computer. The software may utilize the stored configurations to produce one or more types of computer files or data in memory. The resulting computer files or data in memory is dependent on the particular configuration that is currently displayed. The computer files or data in memory may include SPICE netlists, binary files, data structures in the computer's memory or other types of information such as simulator netlists, EDIF netlists, OLE (object linking and embedding) methods and interfaces and so on. The information may be used by SPICE and other programs for other steps in the circuit design/manufacturing process such as layout, manufacturing, data transfer, simulation and so on. It is not necessary to display each of the configurations 70 or layers 76 on the display 54. The configuration-dependent information may also include bill of material netlists, parts netlists, manufacturing/logistical netlists, printed circuit board (PCB) layout netlists, packaging/layout netlists, test and simulation results and report output summaries.

Once the configurations 70 and/or the layers 76 are stored, the netlists may be sent to or accessed by other programs for a variety of purposes. For example, a packaging/layout netlist may be sent to an application for producing integrated circuit (IC) masks or PWB drawings or boards. In addition, test results, which may include information derived from a simulation with specific stimuli and load conditions, may be viewed in a schematic program by a designer and used by other software to develop test-related software. A test report data may be accessed by an automatic test set program generator to control automatic test equipment. Each of these exemplary uses of the configurations 70 and layers 76 may be generally included in the representative output step S6 of FIG. 5, with the specific production of these netlist files and data structures in the computer's memory represented by step S6a. The output mechanisms of the layers 76 and the configurations 70 may also include a hard-copy output via the printer 60 (step S6b) or a visual output via the display 54 (step S6c).

Regarding the visual output mechanism in more detail, any number of configurations 70 may be output to the display 54, as illustrated in FIG. 4, in which Production configuration 70a, Open Loop configuration 70d, and Closed Loop configuration 70c are displayed in respective GUIs 72a, 72c, 72d. In this regard, a user may selectively highlight one of the layers 76 defined in the displayed configuration 70 (step S7). For example, as illustrated in FIG. 3, layer 76c (the Component Level layer) is highlighted in the displayed Closed Loop configuration 70c. This highlight feature may be activated, for example, by a user pointing and clicking with the mouse 58 on any display data 78, 80, or 82 assigned to the layer 76 to be highlighted, or by using a special highlight feature. The highlighted layer 76c allows a user to see all of the symbols 78, interconnections 80, and/or associated information 82 that are assigned to the layer. The highlighting also allows a user to determine to which layer a particular component of the circuit belongs (with the component being represented by data 78, 80, and/or 82). The highlighted layer 76 is preferably highlighted by surrounding the layer by a color or superimposing color around the display information of the layer, causing the layer to stand out against the remaining portions of the GUI 72. Other highlighting techniques may be used.

After viewing a particular configuration 70 or layer 76, a design engineer may want to change a particular aspect or component of the circuit. If the engineer desires to make a change in one of the layers 76, the layer 76 to be changed is displayed (step S8). The engineer may access a particular configuration 70 and, subsequently, a particular layer 76 by using a tool bar 84, and may then make a change to the layer 76 via the input devices 56 and/or 58 (step S9). The change may entail adding data (i.e., symbols 78, interconnections 80, and/or associated information 82) to, deleting data from, or modifying existing data of the layer 76. After making the change, the modified layer 76 may be stored in the memory 68 (step S10). The processor 62 may then propagate the change in each of the configurations 70 which contain the modified layer 76. This procedure of modifying layers 76 may continue throughout the design process. The modification procedure may involve cutting and pasting or moving data from one layer to another. The propagation of changes throughout configurations 70 with a common modified layer 76 substantially eliminates the possibility of transcription errors between configurations 70. In addition, the user will not have to manually open and modify each configuration 70 containing the layer 76 in which the change is to be made. The automatic propagation of the change may be manually activated by the user or may be activated upon resaving of the changed layer 76 (step S10) in the database in the memory 68.

Figure 5:
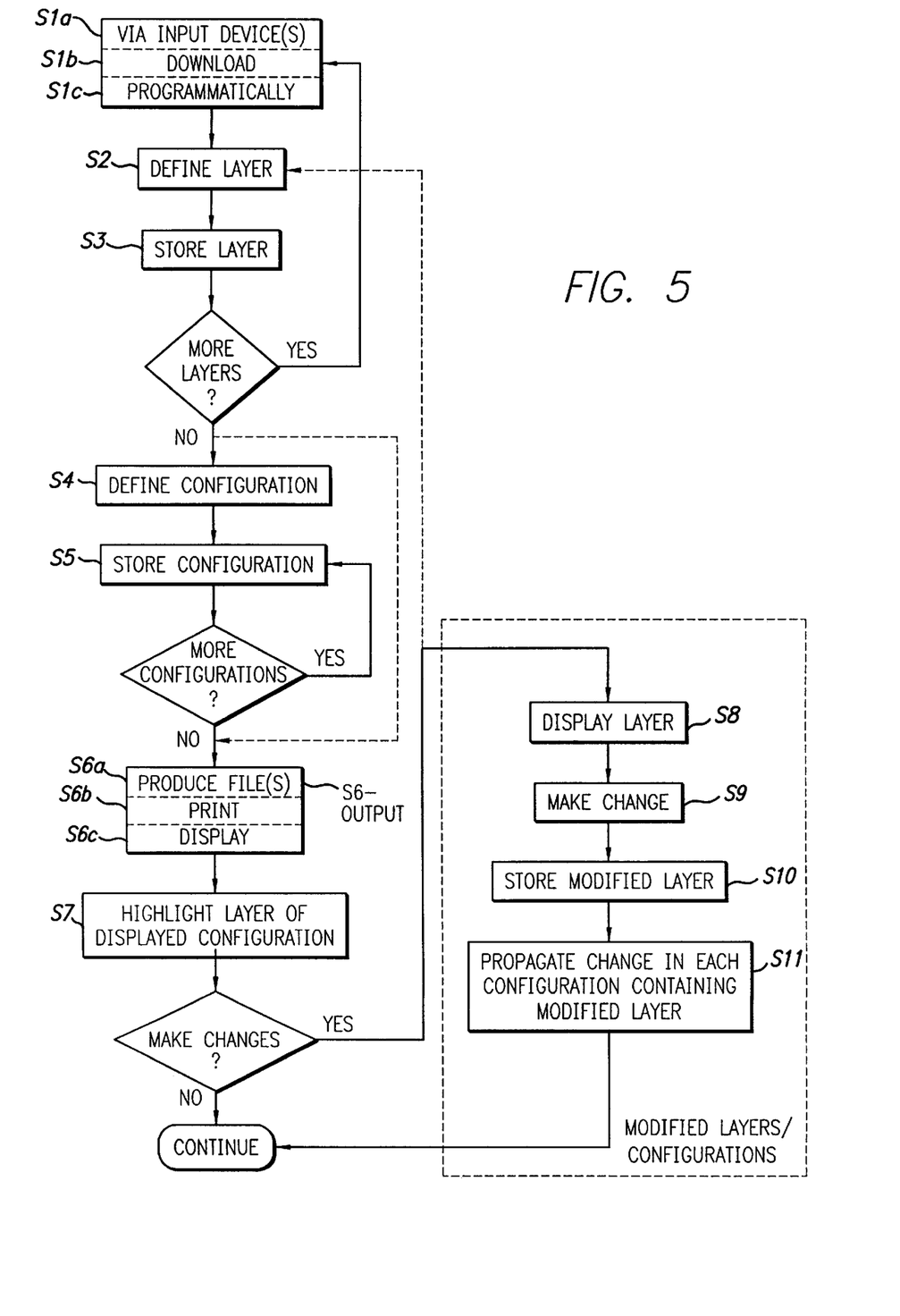
FIG. 5 is a flow chart illustrating an exemplary embodiment of operating methodology in accordance with the present invention.

The above-described procedure and the flow diagram outlined in FIG. 5 are illustrative of exemplary methodology of the present invention. However, the methodology of the present invention is highly versatile and is not limited to that specifically shown. For example, layers may be created and configurations may be defined at any point in the design process. The input of data as represented by step S1 (including symbols, interconnections, part information, simulation-related information, etc.) and the output of data as represented by step S6 (including netlists, simulation results, printouts, pictures, etc.) may occur at any point. The modification of any of the data defining the layers/configurations may also be done at any time in the process. Accordingly, the scope of the present invention is not limited to that specifically shown and described.

The computer 52 preferably maintains a list of created layers 76 and defined configurations 70, each with an identifying name. This list of layers/configurations may be made available to the user, for example, in the tool bar 84 shown in FIG. 4, or by other means. In addition, a user may add (as associated data 82) to a number of layers 76 signal generators which generate respective signal responses of the circuit. The simulated or measured response may be in the form of a graph or a table of data. For example, as exemplified in TABLE I, each of the Test layers 76e–76g may include a different signal generator which tests the circuit according to different parameters. The graphic response of the simulation or measurement may be added to a layer 76 or reside on its own layer. The design engineer may also add textual or graphical annotations as part of the optional data 82 to a layer 76.

The methods of the present invention may be provided to a user in the form of computer code stored on a computer-readable storage medium, such as a floppy disk 86 or a compact-disc read only memory (CD-ROM) 88, as shown in FIG. 1, or, alternatively, provided via the network connections as shown in FIG. 2. The storage medium 86 or 88 may be accessed via the drives 64 or 66, respectively, and stored on the internal hard disk of the computer 52 (not shown). The storage medium 86 or 88 contains a set of computer-readable instructions which cause the computer system 50 to function in response to information entered into the system 50 via the input devices 56 and 58.

Those skilled in the art will understand that the embodiments of the present invention described above exemplify the principles of the invention and do not limit the scope of the invention to those embodiments of the invention specifically illustrated in the drawings and described above. The exemplary embodiments provide a foundation from which numerous alternatives and modifications may be made, which alternatives and modifications are also within the scope of the present invention as defined in the appended claims. With reference to the following claims, unless the claims specifically use language directed to a "means" for performing a particular function, the claims are not intended to be limited to the structure specifically described and illustrated herein, but rather shall be construed to embrace all corresponding structure and equivalents thereof.

What is claimed is:

1. A computerized schematic drawing system for creating a set of schematic configurations each containing a unique set of overlaid schematic layers, each overlaid schematic layer containing display information including schematic symbols, interconnections between schematic symbols, and other optional information, said computerized schematic drawing system comprising:
    a. an input mechanism for receiving:
        (1) the display information and modifications thereto;
        (2) layer assignment information specifying the overlaid schematic layer to which the display information belongs and modifications thereto;
        (3) configuration assignment information specifying each of the configurations to which each overlaid schematic layer belongs and modifications thereto; and
        (4) control information specifying other functions of the drawing system;
    b. a display for selectively displaying one of the configurations including the corresponding set of overlaid schematic layers; and
    c. processing hardware connected to said input mechanism and said display for receiving the display information, the layer assignment information, the configuration assignment information, and the control information, for storing the display information, the layer assignment information, and the configuration assignment information, for automatically propagating modifications in each of the configurations to which the overlaid schematic layer that has been modified belongs, and for causing said display to selectively display one of the configurations including the corresponding set of overlaid schematic layers.

2. A computerized schematic drawing system as claimed in claim 1 further comprising a printer connected to said processing hardware;
    said processing hardware for causing said printer to selectively print the configurations and modifications thereto in conformance with the control information.

3. A computerized schematic drawing system as claimed in claim 1 wherein the information received for modifying one of the overlaid schematic layers includes moving display information from one layer and to another layer.

4. A computerized schematic drawing system as claimed in claim 1 wherein said input device receives information for causing said processor to highlight a selected layer of a displayed configuration.

5. A computerized schematic drawing system as claimed in claim 4 wherein said processor highlights the display information of the selected overlaid schematic layer by superimposing color around the display information specifying the selected overlaid schematic layer.

6. A computerized schematic drawing system as claimed in claim 1 wherein said processing circuitry maintains a list of created overlaid schematic layers and defined configurations.

7. A computerized schematic drawing system as claimed in claim 1 wherein said input device receives display information indicative of stimuli and simulated responses.

8. A computerized schematic drawing system as claimed in claim 1 wherein at least one of the overlaid schematic layers is assigned to at least two of the configurations.

9. A computerized schematic drawing system as claimed in claim 1 wherein at least one of the overlaid schematic layers is unassigned to any of the configurations.

10. A computerized schematic drawing system as claimed in claim 1 wherein said input mechanism includes a hardware device.

11. A computer-readable storage medium containing a set of computer-readable instructions for causing a computer containing an input mechanism, a display, and a storage device to create a set of schematic configurations each containing a unique set of overlaid schematic layers, each overlaid schematic layer containing display information, including schematic symbols, interconnections between schematic symbols, and other optional information, in accordance with the following steps:
    a. receiving via the input mechanism:
        (1) the display information and modifications thereto;
        (2) layer assignment information specifying the overlaid schematic layer to which the display information belongs and modifications thereto;
        (3) configuration assignment information specifing each configuration to which each overlaid schematic layer belongs and modifications thereto; and
        (4) control information specifying other functions of the drawing system;
    b. storing in a storage device the display information, layer assignment information and the configuration assignment information; and
    c. automatically modify each of the configurations to which the overlaid schematic layer that has been modified belongs; and
    d. selectively displaying on a display one of the configurations including the corresponding set of overlaid schematic layers.

12. A computer-readable storage medium as claimed in claim 11 wherein said set of computer-readable instructions further causes the computer to:
    receive via the input mechanism information for displaying a configuration with a selected layer thereof highlighted; and
    display the configuration with the selected layer highlighted.

13. A computerized schematic drawing method for creating a set of schematic configurations each containing a unique set of overlaid schematic layers, each overlaid schematic layer containing display information, including schematic symbols, interconnections between schematic symbols, and other optional information, said method comprising the steps of:

a. receiving via an input mechanism:
        (1) the display information and modifications thereto;
        (2) layer assignment information specifying the overlaid schematic layer to which the display information belongs and modifications thereto;
        (3) configuration assignment information specifying each configuration to which each overlaid schematic layer belongs and modifications thereto, at least one of the overlaid schematic layers being assigned to at least two of the drawings; and
        (4) control information specifying other functions of the drawing system;
    b. storing in a storage device the display information, layer assignment information and the configuration assignment information;
    c. receiving via the input mechanism information for modifing one of the overlaid schematic layers;
    d. automatically modifing each of the configurations to which the overlaid schematic layer that has been modified belongs; and
    e. selectively displaying on a display one of the configurations including the corresponding set of overlaid schematic layers.

14. A computerized schematic drawing method as claimed in claim 13 further comprising the steps of:

receiving via the input mechanism information for displaying a configuration with a selected layer thereof highlighted; and     displaying the configuration with the selected layer highlighted.

15. A computerized schematic drawing system as claimed in claim 13 wherein said processor maintains a list of created overlaid schematic layers and defined configurations.

16. A computerized schematic drawing system for creating a set of schematic configurations each containing a unique set of overlaid schematic layers, each overlaid schematic layer containing display information including schematic symbols, interconnections between schematic symbols, and other optional information, said computerized schematic drawing system comprising:

a. input means for receiving:
        (1) the display information and modifications thereto;
        (2) layer assignment information specifying the overlaid schematic layer to which the display information belongs and modifications thereto;
        (3) configuration assignment information specifying each of the configurations to which each overlaid schematic layer belongs and modifications thereto; and
        (4) control information specifying other functions of the drawing system;
    b. display means for selectively displaying one of the configurations including the corresponding set of overlaid schematic layers;
    c. an automatic modification means for automatically modifying each of the configurations to which the overlaid schematic layer that has been modified belongs; and
    d. processing means connected to said input mechanism and said display for receiving the display information, the layer assignment information, the configuration assignment information, and the control information, for storing the display information, the layer assignment information, and the configuration assignment information, for causing said display to selectively display one of the configurations including the corresponding set of overlaid schematic layers.

17. A computerized schematic drawing system as claimed in claim 16 wherein said input means includes a hardware device.

18. A computerized schematic drawing system as claimed in claim 16 further comprising printing means connected to said processing means for selectively printing the configurations.

19. A computerized schematic drawing system as claimed in claim 16 wherein said processing means includes a central processing unit.

20. A computerized schematic drawing system as claimed in claim 19 wherein said input means includes a hardware device.

\* \* \* \* \*